United States Patent

[11] 3,552,288

[72] Inventor Ferrand David Ernest Corley
 2 Wimbleton Crescent, Islington, Ontario, Canada
[21] Appl. No. 699,174
[22] Filed Jan. 19, 1968
[45] Patented Jan. 5, 1971

[54] GREY-SCALE TEST SLIDE
 4 Claims, 11 Drawing Figs.
[52] U.S. Cl. .................................................. 95/12.2, 178/5.2; 355/35
[51] Int. Cl. .................................................. G03b 33/00
[50] Field of Search ....................................... 178/5.2(A), 6.0; 95/10A, 10B, 12.2; 355/32, 53, 37, 95, 35

[56] References Cited
UNITED STATES PATENTS

| | | | |
|---|---|---|---|
| 2,050,417 | 8/1936 | Bocca | 95/12.2 |
| 2,258,593 | 10/1941 | Black | 95/10(A) |
| 2,380,244 | 7/1945 | Jones | 95/10(A) |
| 2,582,004 | 1/1952 | Capstaff | 95/10(A) |
| 2,981,791 | 4/1961 | Dixon | 178/5.2(A) |
| 3,041,932 | 7/1962 | Kilminster | 178/5.2(A) |
| 3,323,431 | 6/1967 | Land | 95/10(B) |
| 3,482,914 | 12/1969 | Misener | 355/36 |
| 3,482,915 | 12/1969 | Corley | 355/37 |

OTHER REFERENCES
I.B.M. Technical Disclosure Bulletin. Vol. 7, No. 4, Sept. 1964, "Step & Repeat Camera."

*Primary Examiner*—John M. Horan
*Assistant Examiner*—Robert P. Greiner

ABSTRACT: This specification describes a film slide, or in some cases a length of motion picture film, which is used to test the alignment of the camera or separate cameras in a colour telecine camera chain. The slide or other piece of film will incorporate an overall uniform density background area and a central rectangular portion consisting of a series of strips of varying density of grey, varying from almost black to light grey. The slide or other piece of film is a piece of dye image colour film which when developed is characterized by an absence of any substantial quantity of silver image forming materials in which the images are formed by reacted dyes, and each of the images, although appearing in various densities of grey to the naked eye, in fact will provide a precisely proportioned response to red, green and blue light respectively, and in addition provides an overall precisely proportioned graduation in density from strip to strip to form a so-called "staircase wedge," thereby providing a standard whereby to test and if necessary adjust the colour telecine camera chain. The specification also discloses a preferred method of making such a slide.

PATENTED JAN 5 1971

INVENTOR.
FERRAND D. E. CORLEY

BY George A. Rolston

Agent

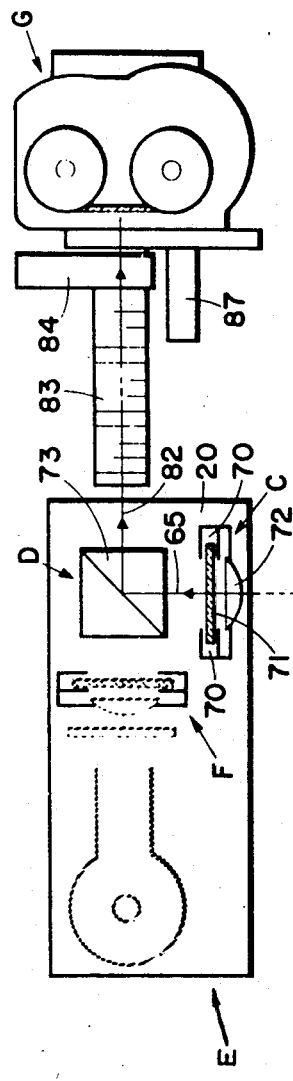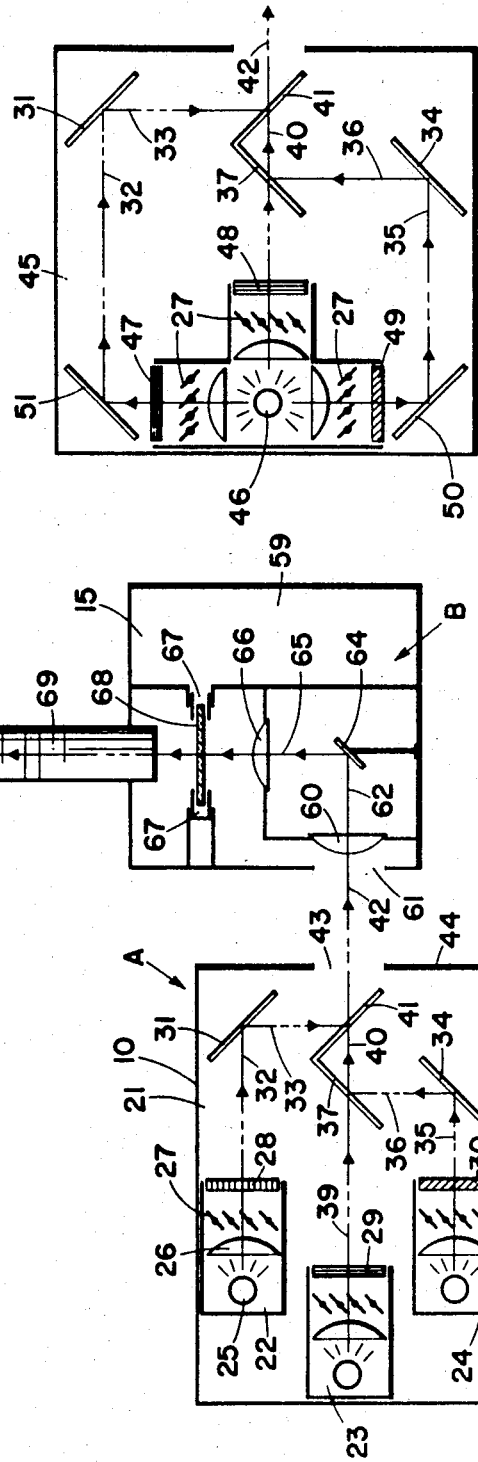

PATENTED JAN 5 1971

*INVENTOR.*
FERRAND D. E. CORLEY

BY *George A. Rolston*

Agent

GREY-SCALE TEST SLIDE

This invention relates to a film transparency preferably in the form of a slide adapted for use with a slide projector or in the field lens of a colour telecine chain, the transparency incorporating an image having a series of strips of different densities of grey which are employed in association with colour telecine camera chains as a standard for adjusting the setting thereof, or such transparency may be embodied in a length of motion picture film, and to a method of producing such slides.

Colour telecine camera chains consist essentially of three or usually four separate black and white cameras three of which are provided with colour filters, so as to provide the three basic colours in the eventual image, and the fourth of which (if present) provides a monochrome image. It is well known that the adjustment of the sensitivity of each of the four cameras is extremely critical, and must be arranged so that the intensities of the various depths or shades of the image picked up by each of the four cameras must be substantially equal or balanced. If this is not the case, and if for example the blue camera is picking up a stronger image than the red camera then the projected combined image will be badly distorted in terms of an excess of blue and weakness of red. In addition to this basic problem, a further problem is caused by the fact that in each of the four cameras there are provided several adjustments arranged to permit adjustment of sensitivity over the range of 100 percent from dark grey to pale grey. Thus, as a first adjustment, it is desirable that each of the cameras be precisely adjusted to a common standard to assure that the brightness levels vary in a linear manner across the entire range. Secondly, it is necessary that the overall brightness levels of each of the four cameras be balanced with one another so that each of the four cameras is producing an image of equal brightness. It will further be understood that while there is provided in the camera chain a purely electronic dummy input signal against which some adjustments could be tested, in practice this system is incomplete, and in fact is not capable of aligning the entire camera chain. The reason for this is simply that each of the projectors which are normally used for projecting an image into the camera has certain built in variable optical and other characteristics which cannot be predicted. Thus no two bulbs or other light sources will produce illumination at precisely the same temperature and of the same characteristics. In addition, the lens characteristics of the particular projection system will also affect the nature of the image projected into the camera. One expedient has been devised known as the "Holmes-CBC" slide which is described in an article entitled New CBC Vidicon Telecine Operating Standards by S. F. Quinn and J. Bowie Dickson, Journal of the S.M.P.T.E. volume 73 Dec. 1964 No. 12 pages 1009 to 1014. The slide referred to in this article consists essentially of an image produced on a black and white transparency, which image consists of a group of ten strips which are intended to vary in density, or depth of grey by about 10 percent, a so-called "staircase wedge." Preferably, two such rows of 10 strips are arranged one above the other, but varying from dark to light grey in opposite directions ie. the lower such band will be dark on the right-hand side and light on the left-hand side whereas the upper band will be dark on the left-hand side and light on the right-hand side. The remainder of the slide consists essentially of an even midgrey area. Various problems were encountered using this so-called grey scale slide. In the first place, the manufacture of the slide itself was found to be an extremely sensitive and critical procedure and it was only of use in alignment of black and white television and was of no use in colour television. In addition, other factors such as the fact that a silver image, as is produced in black and white film does not respond in a linear manner to different wavelengths of light, ie. more of one colour will be passed than of another, as the density of silver image varies. As a result, it was found that even though very great pains were taken to ensure as nearly as possible an exact gradation of density between each of the strips of grey, that when used in connection with a colour telecine camera chain for the purpose of aligning the cameras photographing the three different colours, that variations in the density of the strips when projected into the camera through the respective red, green and blue filters caused errors in the adjustment of the three cameras. While it is true that the Holmes CBC grey scale slide represented a considerable step forward in the field of black and white television at the time, its failure with colour television has prevented it from achieving distribution.

According to the present invention, these various problems of the Holmes slide may be eliminated, and a slide may be provided which is capable of passing either equal quantities of red, green and blue light or predetermined unequal quantities throughout all of the ten separate strips, and which will sustain this balanced performance when used in a colour telecine camera chain. In addition, the invention also comprehends the method of manufacturing such a slide.

In my U.S. Pat. No. 3,482,915 entitled Colour Film Reproducing System, dated Dec. 9, 1969 by Ferrand D.E. Corley, there is described a method and apparatus of general utility in connection with the reproduction of colour slides. The same apparatus is also employed for the production of the grey scale slides according to the invention the subject matter of the present application, and such apparatus, and method of employing the same are therefore described and included in the present application so as to constitute a full disclosure of the present invention. However, although the apparatus described is essentially the same, it will be understood that the method of operation will vary slightly from the method of operation described in my U.S. Pat. No. 3,482,915 since the apparatus is not used for reproducing an existing colour slide, but rather for producing a new and original slide in which the colours will appear in varying densities of grey to the naked eye. For the sake of simplicity therefore, it is deemed preferable to commence with a description of the slide itself, and then to describe the apparatus, and then to describe the method of employing the apparatus to produce the slide.

The foregoing and other advantages of the present invention will become apparent from the following description of a preferred embodiment of the invention which is given here by way of example only, with reference to the following drawings in which like reference devices refer to like parts thereof through the various views and diagrams and in which:

FIG. 3 is a diagrammatic plan view of the system with parts shown in phantom;

FIG. 4 is a detailed diagrammatic plan view of a modification of the first light source;

Figure 10:
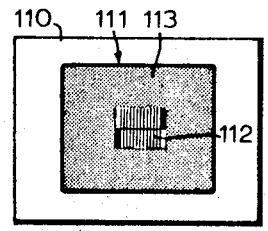
FIG. 10 is an elevation of the resultant grey-scale test slide.
Figure 11:
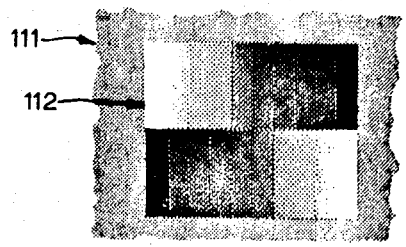
FIG. 11 is a greatly enlarged elevational view of the "staircase wedge" portion of the test slide of FIG. 10 showing the graduated strips.
Figure 7:
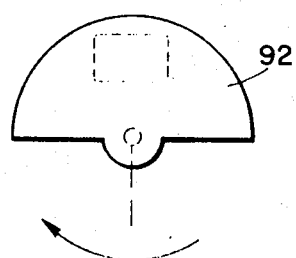
FIG. 7 is a diagrammatic view of a modified form of shutter.

According to the present invention, the grey scale test slide embodying the invention is shown in FIG. 10. The slide consists essentially of a slide frame indicated generally as 110 of any suitable well known and conventional construction, which is not described for the sake of clarity, and a portion of reversal colour film or negative positive type colour film, a so-called "transparency," indicated as 111 having a central image 112, which image consists of two bans arranged one above the other each band having 10 separate strips, the strip at one end being dark and the strip at the other end being light, and the intermediate strips varying in density by increments of roughly 10 percent in the case of the slide illustrated, having 10 strips in each band. The variation between any two strips of the central image 112 will depend upon the total number of such strips and upon specific standards established in the laboratory for a particular type of colour telecine camera and will not, even where, as shown, 10 such strips are found in each band, in fact be precise equal increments of 10 percent. Examples of two such sets of standards are shown in the Quinn and Dickson paper cited (page 1012 - table 11) although both of these standards are now out of date.

In addition, it is essential that not only do the densities of the strips meet the standards laid down when tested under black and white conditions but that they should also meet the standards laid down for densities when tested under red, green, and blue, light respectively. Usually these standards will require red, green and blue light to be equally balanced, but under certain conditions it may be considered that one or more colours should be emphasized and under these circumstances the standards will of course vary.

Thus each such strip in the image 112 may be said to comprise predetermined specified density levels of red, green and blue reacted dyes combined together to give a further predetermined specified overall density level, each of the strips being of regular even density throughout its own extent, and all of the strips being of equal size arranged side-by-side to define sharp demarcations between each, or so-called "stepped" gradations. The remaining border portion 113 of the transparency 111 consists of a uniform density background which is even throughout its extent. Each of the 20 separate strips of the preferred embodiment as illustrated constituting the image 112 is arranged so as to pass or reject, predetermined quantities of red, green and blue light, and the image 112 is defined by dyes incorporated in the film stock 111 itself, as opposed to the image being formed by reacted silver halides as in the case of black and white film, which tend to scatter certain wavelengths of the light passing therethrough in an unequal manner. Selective scattering of light in an enlarger or similar optical system was first investigated by Andre Callier in 1909. In an enlarger, or other optical system, the condenser is normally adjusted so that the light leaving it comes to a focus at the lens when there is no negative in the carrier. With a negative in the carrier, part of this light is scattered by the silver grains forming the image, and thus a portion of the light does not reach the enlarging lens. The highlights of the negative, corresponding to the heaviest deposit of silver, scatter and lose most light. The clearer part of the negative corresponding to the shadows, scatter less light. Because of the so-called Callier effect, the density of an even image area on a photographic negative or transparency is greater when measured by directed light (specular density) when measured by diffused light (diffused density). In former case the density is due to absorption as well as scattering of light; in the latter case the density is due to absorption only. The ratio of specular to diffuse density is the Callier quotient or coefficient (the so-called Callier Q factor). It will be understood that the image 112 and the surrounding border portion 113 are all formed by dyes within the same layer of films stock 111 without resort to laminations or other expedients which would effect the accuracy of the performance of the slides.

The apparatus by means of which the transparency 111 is produced, is essentially the same as that described in my U.S. Letters Pat. No. 3,482,915. However, the method of operation is somewhat different, and some portions of the apparatus are in fact superfluous. For this reason, a description of the apparatus is included in this application for the better understanding of the method of operation.

GENERAL ASSEMBLY

Figure 2:
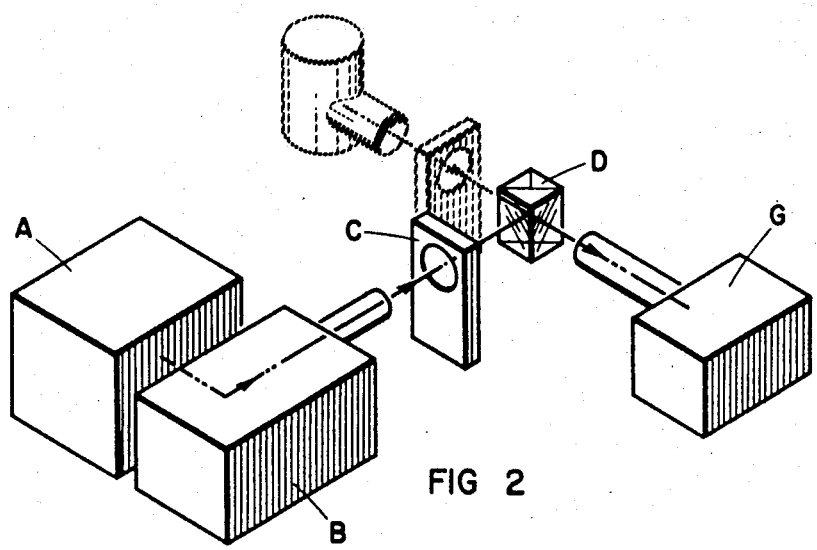
FIG. 2 is a diagrammatic perspective of the basic elements of the system with parts shown in phantom.

The basic components of the present system are indicated diagrammatically in FIG. 2. They comprise a first source of coloured light A; a projector B; a holder C for a reverse image carrying member; a duplex prism D; and a camera G. A second source of coloured light E and a holder F for a third image are shown in phantom, as being part of the overall apparatus, but not in fact being used when manufacturing a slide.

Figure 1:
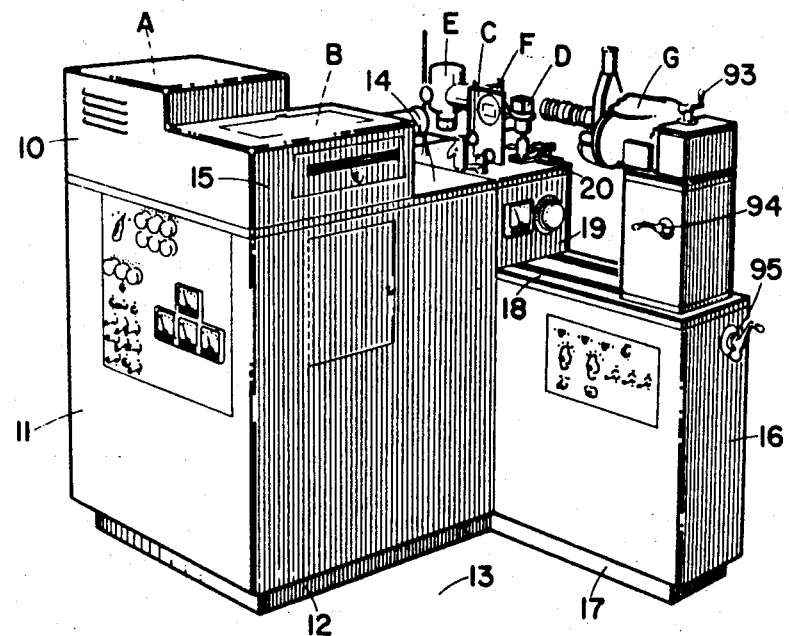
FIG. 1 is a perspective view of apparatus designed to incorporate the system of the invention and perform the method thereof.

Referring now to FIG. 1 the various elements making up the light source A are housed in a casing 10 that is mounted on a cabinet 11. The latter has a base 12 that rests on a suitable supporting surface such as floor 13. The cabinet 11 includes a top work table 14 on which the casing 10 rests.

A second casing 15 houses the projector B and is positioned on the work table 14. As illustrated in FIG. 1 the cabinets 10 and 15 may be combined into a unitary structure. Another cabinet 16 is shown having a base 17 supported from the floor 13 and an upper working surface 18. Supported on the latter is a box 19 having a working table 20 on the same plane as the table 14 with which it aligns.

The holder C is supported from the table 20 as is the duplex prism D, second light source E, holder F and camera G.

The relative position of the components is of importance from the viewpoint of providing a compact, workable arrangement. The light source A and projector B are side by side. The projector B, holder C, and mirror D align as do the second light source E, holder F, and prism D and camera G, with the latter alignment being normal to that of B. C. and D.

FIRST LIGHT SOURCE

Referring now to FIG. 3 the several and of the light source A are shown as mounted on a base 21. They comprise units 22, 23 and 24, These units are, with the exception of the colour of the filter included therein, substantially alike. Thus the unit 22 is shown as made up of a lamp 25, condensing lens 26, shutter 27 and filter 28. For the purposes of this specification the filter 28 is identified as being blue. It will be understood that so far as this invention is concerned all that is required is that there be a filter for each of the primary colours; red, blue and green, irrespective of any particular arrangement.

The unit 23 is the same as unit 22 except that the filter 29 is red. Likewise the unit 24 is the same as units 22 and 23 except that the filter 30 is green.

Mounted on the base 21 in front of the filter 28, and disposed at an angle of 45° relative thereto, is a reflector 31. Light from the filter 28 is represented by the line 32 and reflected light by the line 33. Another reflector 34 is mounted on the base 21 in front of the filter 30 and arranged at an angle of 45° with respect thereto. Light from the filter 30 is represented by the line 35 and reflected light by the line 36.

A dichroic mirror 37 is shown as mounted on base 21 in front of the filter 29 and positioned at an angle of 45° relative thereto. The side of mirror 37 adjacent to filter 29 is the transducing side and light represented by line 39 coming from the filter 29 passes therethrough whence it combines with light 36 reflected from the reflecting side of the dichroic mirror 37. Combined light 36 and 39 is depicted at 40. A second dichroic mirror 41 is arranged normal to the mirror 31 and combined light 40 passes through the transducing side thereof whereupon it is combined with light 33 reflected from mirror 31. The combined unitary light beam is represented at 42 and passes through an aperture 43 formed in a wall 44 of the casing 10.

A modified first light source is shown in FIG. 4. It is mounted on a base 45 of a shape somewhat different from the base 21 and comprises a single lamp 46 with filters 47, 48 and 49 being arranged therewith in angularly spaced relation. Reflectors 50 and 51 are shown as being disposed opposite to the filter 49 and 47 respectively and at angles of 45° with respect thereto. Shutters 27 are included in the same relation to the filters and the remaining arrangement of reflectors and dichroic mirrors is the same as that illustrated in FIG. 3 and bear the same reference characters.

Figure 5:
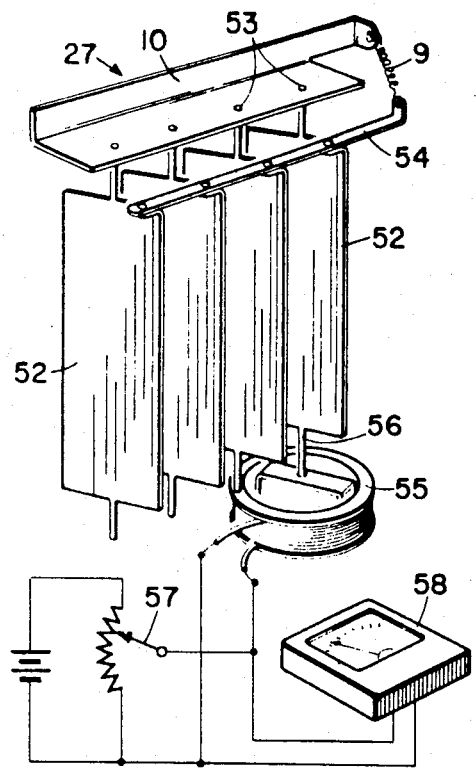
FIG. 5 is a detailed perspective on an enlarged scale, of a shutter device that may be associated with each filter to adjust the intensity of the light provided thereby.

The function attributed to each of the shutters 27 is to control the intensity of light admitted to the filter, this being determined by the extent to which any shutter is opened. Referring now more particularly to FIG. 5 one of these shutters 27 is shown as of the Venetian blind type comprising a plurality of vanes 52 each pivotally mounted at 53 and connected to operate in unison by a rod 54. A meter-type motor is shown at 55 and includes a drive shaft 56 which is directly connected to one of the vanes 52 on the axis of its pivotal mounting 53. A spring 9 has one end anchored to the rod 54 and the other to the casing 10.

The motor 55 is of the induction type with the arrow at 57 determining the extent to which the vanes are opened. A meter 58 is connected in parallel with the motor 55 and is located on the wall of the cabinet 11 as shown in FIG. 1 where it may be viewed by the operator. It will be understood that there is a shutter, motor and meter for each of the filters. This arrangement can be improved by providing a stepper motor in place of the meter motor, and a transistorised switch means controlled by a second potentiometer (not shown). In this way the precise location of vanes 52 can be infinitely controlled from a remote location.

Referring again to FIG. 3 the elements of the projector B are shown as mounted on a base 59. They comprise a condensing lens 60 located opposite to an opening 61 formed in a wall of the casing 15 and opposite to the opening 43. Thus the beam 42 passes through the apertures 43 and 61 onto the lens 60. From the latter the concentrated beam represented at 62 engates a target 64. The latter takes the form of reflector of magnesium oxide or comparable material and is arranged at an angle Z of about 45° or more with respect to the beam 65. Larger values for Z are preferred, especially if the angle can be substantially 90°. Such arrangement will require relocation of the unit A of FIG. 3 so that the unitary light beam 42 makes the smallest possible angle Y with the reflected beam 65 reflected from target through condensing lens 66. The modified first light source before described with reference to FIG. 4 may embody a modified form of target comprising an opal source plate 64a in the path of a suitable lens 64b axially aligned with ray 40 whereby the ray path 40 may be substituted for ray path 62 of FIG. 3 and target 64 and light source A thereof, in which event, the opal source plate or source target will be at an angle Z equal to 90°.

A holder for a filter member, which may be a variety of different intensities is shown as including structure providing opposed channels 67. Filter member 68 may be either a film or slide and is positioned in the channels 67. Adjusting means (not shown) enable flexibility of accurate positioning of member 68 and channels 67.

The projector B includes a conventional assembly of projecting lenses housed within a tube 69. Such projecting lenses are well known and are, therefore, not illustrated.

RECEIVER, DUPLEX PRISM

Figure 8:
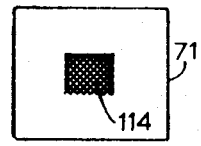
FIG. 8 is an elevation of a slide or mask carrying the first image.
Figure 9:
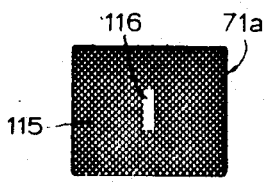
FIG. 9 is an elevation of a slide or mask carrying the second and subsequent images.

The receiver C for mask carrying member is shown as mounted on the table 20. The holder proper comprises a pair of spaced confronting channel members 70 which removably receive a member 71 or 71a which may be either a film or slide and which carries a mask that is either as shown in FIG. 8 as 114 or FIG. 9 and 115 and 116 respectively. Between the end of projector tube 69 and member 71 is a lens 72 that may be mounted on and included as a part of the receiver C.

The duplex prism D at 73 consists of two prisms 73a and 73b having an interface 73c which is a 70 percent reflecting mirror surface permitting 30 percent light transmission therethrough defined by a vacuum deposit mirror layer (represented by the numeral 73c defining the interface of 73a —73b and formed by a vacuum deposit technique known to skilled persons in the mirror deposit arts). Prism member 73 is rigidly mounted on table 20. Light beam 62 passes through lens 66, filter member 68, projector tube 69, lens 72 and mask carrying member 71, whereupon it enters prism element 73b to be reflected by mirror surface 73c located at an angle of 45° with respect to beam 65.

THE CAMERA

Figure 6:
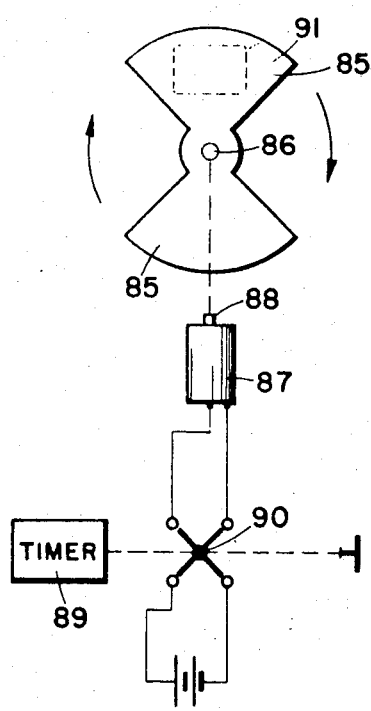
FIG. 6 is a diagrammatic view of the shutter of the camera and stepper motor for operating the shutter.

The camera G is mounted on the table 18. It includes a lens system housed in tube 83 into which the reflected beam now shown as 82 is introduced. A reflex viewer is represented diagrammatically at 84 and may be availed of by the operator to determine the characteristics of the beam 82. A shutter which does not appear in FIG. 3 is illustrated on an enlarged scale in FIG. 6. The shutter is of the butterfly type comprising two sections 85 which are pivotally mounted at 86. A step motor 87 has a drive shaft 88 which communicates by a 1:1 drive connection to shutter supporting drive shaft 86. A timer 89 is connected to switch 90 of the motor.

Step motors of this type are well known and available to the purchasing public as such. Upon being energized the motor 87 moves the vanes 85 through 90°. This exposes the eye 91 for a predetermined interval, say for example, one twentieth of a second, whereupon the vanes 85 move through another 90° to mask the eye 91. Obviously the exposure time may be varied in accordance with known practice.

A modified form of shutter is shown at 92. It is of the half moon type and one cycle of operation required movement by a 2:1 ratio drive through 360° as compared to the 180° for the butterfly of FIG. 6.

The remainder of the mechanism of the camera G is of conventional design. As shown in FIG. 1 three operating members 93, 94 and 95 are provided to adjust the position of the camera G in three dimensions. This is important because it is necessary to bring the camera tube 83 into exact alignment with the beam 82.

OPERATION

While the manner in which the system and method of this invention operates is believed to be obvious from the illustrations of the drawings and description of parts given one method of operation is hereinafter described. It will be understood that both the system and method are highly flexible and various elements thereof may be omitted and combined in numerous ways to achieve a desired result.

The manufacturer of a grey scale slide according to the invention involves making 21 separate exposures on the same piece of unexposed film stock (not shown) within the camera G. The first of these exposures exposes the film stock so as to provide a neutral background area 113 (see FIG. 10) and the remaining 20 exposures expose 20 different strips of the film stock thereby building up the image 112. At each exposure the colour balance must be suitable adjusted by means of the apparatus described in connection with the first light source A, and the intensity of the light is adjusted by means of changing the filter member 68, such filter member being provided in a sufficient number of different densities to provide ten different levels of density required in the finished image 112. Alternatively, the different densities comprising image 112 can be to some extent controlled or varied by varying both the exposure time and the aperture in the camera G itself, although it is generally speaking found to be more satisfactory to vary the filter member 68 in actual practice, due to variations introduced in the end result by reason of the particular emulsions used on the film stock which may respond differently to differing exposure times.

The sequence of operations will be substantially as follows:

A neutral midgrey filter member 68 is provided in receiver 67, and mask member 71 provided with a central rectangular black portion 114 as shown in FIG. 8, is placed in receiver 70. The light source A is then adjusted so as to provide a colour balance as between the red, green and blue coloured light, in accordance with the specifications laid down for the particular colour telecine camera chain. The camera G is then focused exactly on the mask member 71, and by means of the reflex viewer 84, the rectangular portion 114 is centered precisely in the middle of the frame.

A first exposure is then taken.

The mask member 71 is then removed and replaced by mask member 71a. The filter member 68 is then replaced by a different member filter 68 of a different density dependent upon the particular strip in image 112 that is desired to expose. Assuming the same colour balance is required, light source A may be left unchanged, although in some cases a different colour balance may be required as between different such strips in the image 112. The camera G is aligned by means of the controls 93 and 94, so as to locate slot 116 in the predetermined desired location in the reflex viewer 84 that it is desired to expose, obviously, such location being somewhere within the unexposed central rectangle of the piece of film stock within the camera G. A second exposure is then taken. It will be understood that although the method as described herein involves movement of the camera itself, all that is in fact required is some form of relative movement between the camera and the mask member. Thus it will be equally within the scope of the invention to move the mask member while leaving the camera stationary. This procedure is then repeated another 19 times, in each case, the colour balance being first checked, the filter member 68 being suited to the particular density of grey to be exposed, and the camera being refocussed and realigned so as to expose a separate strip within the image 112 at each exposure.

After completion of the 21 exposures, the piece of film stock is then developed. Assuming it is of the reversal type colour film, the image will be developed in the piece of film stock itself. On the other hand, if it is a piece of negative positive type film, then the image will appear reversed. The finished transparency is then mounted in a slide frame, preferably between two pieces of glass in known manner and is then ready for use.

It will be understood that the 10 separate strips illustrated in each band is merely a preferred and accepted example. More or less such strips may be employed without departing from the invention. In that event of course the percentage variations in density of grey from strip to strip will also be adjusted to correspond.

The apparatus described is shown as incorporating a reflecting prism D. In fact it will be seen that this is unnecessary to the manufacture of slides according to the invention. Camera G could simply be aligned directed with projector B if desired.

The invention includes such variations as come within the spirit and scope of the appended claims.

I claim:

1. A test film frame for incorporation in a slide, motion picture or the like, for use in the testing and alignment of colour cameras employed in colour television such as colour telecine camera chains so as to bring said cameras into alignment with predetermined desired standard characteristics at different densities of red, green and blue in images sensed by such colour camera chains thereby to produce accurate reproduction of colours in such images when displayed on television and seen by the human eye in which errors in light transmission of light of different wavelengths due to presence of light scattering substances in the film material have been eliminated, said frame comprising:

a portion of exposed and developed dye image type colour film from which substantially all light scattering materials have been removed;

a plurality of distinct strips of separately exposed dye image materials within a central area of said film portion one of said strips being of a grey density paler than the others, another of said strips being of a grey density darker than the others, and the remaining said strips being arranged in varying intermediate densities of grey, said strips being arranged in a row with the paler said strip at one end and the darker said strips at the other end, and the intervening said strips being arranged therebetween in graduated order of density, each of said strips comprising evenly exposed and developed dye image materials from which substantially all light scattering materials have been removed within said portion of colour film, said dye image materials providing predetermined specified densities with regard to red, green and blue light respectively, and together providing a combined predetermined specified grey density, said specified densities being matched to the desired standard characteristics for colour telecine camera chains as aforesaid; and a neutral border surrounding said strips of substantially even density through out its extent.

2. A test film frame as claimed in claim 1 wherein each of said strips, is exposed and developed to provide predetermined equal densities with regard to red, green and blue light respectively at its predetermined respective grey density level.

3. A test film frame as claimed in claim 1 including two thin sheets of glass sandwiching said portion of said colour film, and rigid rectangular support frame means surrounding said two pieces of glass and said colour film, dimensioned to support the same within the slide support of a slide projector.

4. A test film frame as claimed in claim 1, wherein said portion of exposed and developed colour film is an integral part of a length of motion picture film, said motion picture film including a plurality of said test film frames printed in an identical manner in sequence therealong.